Sept. 9, 1924.
G. D. KRATZ
METHOD OF MAKING CORD TIRES
Filed Aug. 14, 1920
1,507,743
2 Sheets-Sheet 1
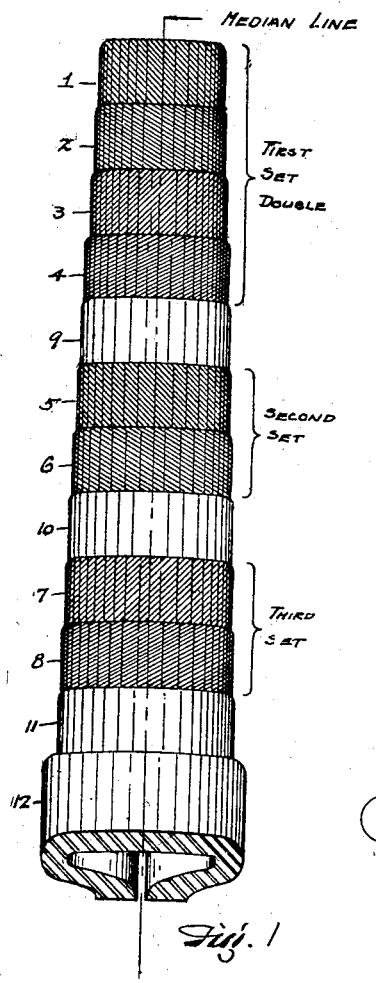
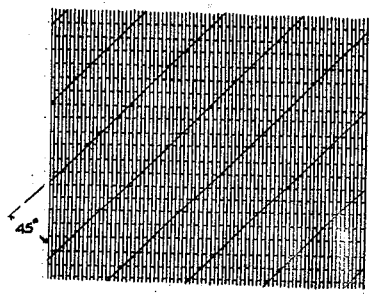
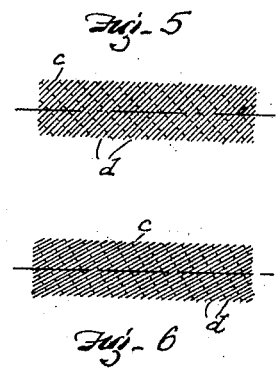
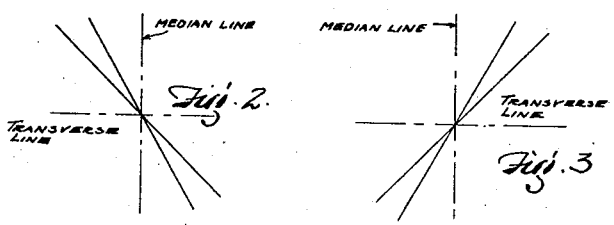
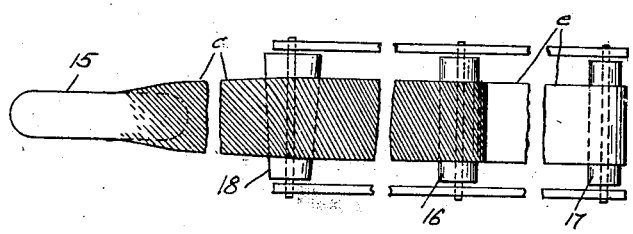
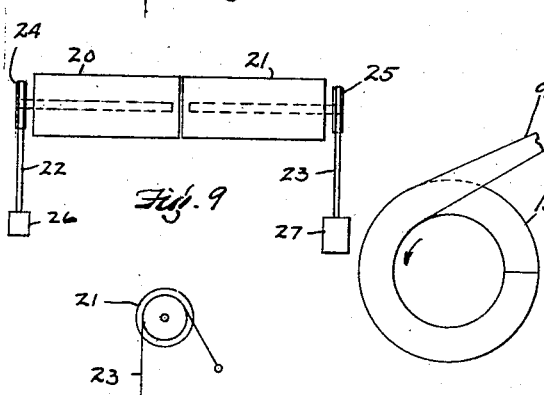
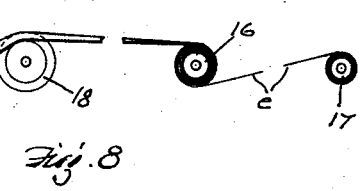
INVENTOR
George D. Kratz
By Fay, Oberlin & Fay
ATTORNEYS.

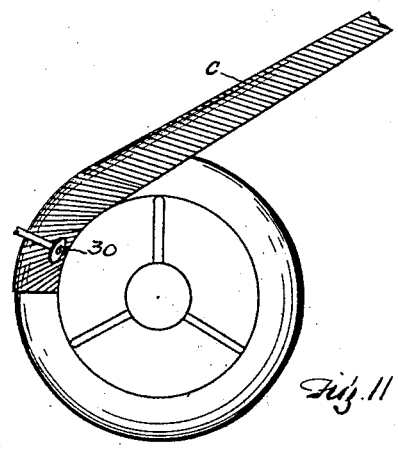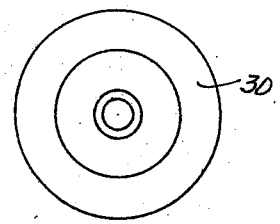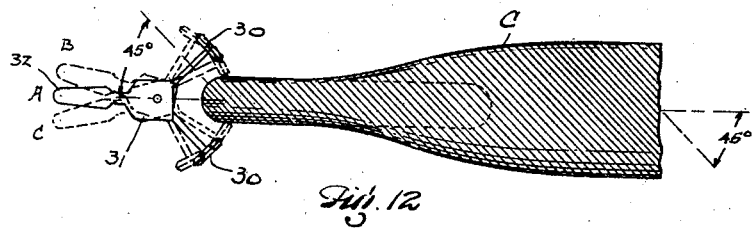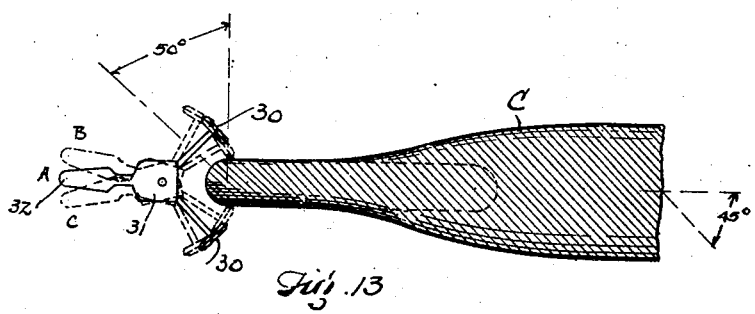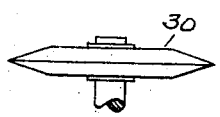

Patented Sept. 9, 1924.

1,507,743

UNITED STATES PATENT OFFICE.

GEORGE D. KRATZ, OF AKRON, OHIO, ASSIGNOR TO THE FALLS RUBBER COMPANY, OF CUYAHOGA FALLS, OHIO, A CORPORATION OF OHIO.

METHOD OF MAKING CORD TIRES.

Application filed August 14, 1920. Serial No. 403,576.

*To all whom it may concern:*

Be it known that I, GEORGE D. KRATZ, a citizen of the United States, and a resident of Akron, county of Summit, and State of Ohio, have invented a new and useful Improvement in Methods of Making Cord Tires, of which the following is a specification, the principle of the invention being herein explained and the best mode in which I have contemplated applying that principle, so as to distinguish it from other inventions.

The present improvements relate more particularly to the manufacture of cord tires constructed of so-called thread-fabric or cord-fabric, i. e. of a fabric composed of strong longitudinal warp threads held together by fine non-stretching, non-strength-giving weft threads. Indeed, ordinarily such warp threads are held together simply by the film or coating of rubber which is regularly used as a cementing or binding material to hold the several layers of the tire together.

In my co-pending application, filed May 26, 1919, Serial No. 299,875, I have shown and described a cord tire built up of sets of superimposed layers of such thread or cord-fabric, the various layers or threads of such sets being at a slight angle to each other and diverging from each other at a median line at or parallel to the periphery of the tire, any two intersecting threads lying in the quadrant formed by such a median line and a line at right angles to it passing through their point of intersection. In such co-pending application I explain how that the various fabric plies may either be cut initially to the desired angularity, and then superimposed one upon the other in the manner described, or that successive plies may be cut initially all at the same angle, and such angularity subsequently modified incidentally to the superposition of the plies one upon the other, in order to secure the desired effect in the composite structure.

The present improvements have regard more particularly to this last mentioned method of constructing cord tires of the type in hand, the object being to provide suitable steps and improved mechanical devices whereby all the plies of fabric used in the construction of such a tire may be cut at the same angle to the warp threads and then distorted to various degrees of angularity during the construction of the tire itself. This procedure not only effects a great decrease in wastage in the cutting of the various plies of fabric, but also, owing to the mechanical features in the application of superimposing one ply of fabric upon another, prevents the possibility of confusing plies of different angularities.

To the accomplishment of the foregoing and related ends, the invention, then, consists of the steps hereinafter fully described and particularly pointed out in the claims, the annexed drawings and the following description setting forth in detail certain mechanism embodying the invention, such disclosed means illustrating, however, but several of the various ways in which the principle of the invention may be utilized or embodied.

In said annexed drawings:—

Fig. 1 is a plan view of a section of a tire of the type herein involved, shown for convenience as a straight instead of a curved section, and with successive portions broken away better to illustrate the interior construction thereof; Figs. 2 and 3 are diagrammatic views respectively illustrating the angular relationship of the warp threads in contiguous layers or plies of fabric composing such tire; Fig. 4 shows my present improved method of cutting the strips or plies from a sheet of fabric; Fig. 5 is a view of such a strip or ply after being cut from the sheet; Fig. 6 is a view of the same strip as in Fig. 5, but after it has been distorted or stretched to give the effect of cutting the same on a different angle from the original sheet; Fig. 7 is a plan view, and Fig. 8 a side elevation, both more or less diagrammatic in character, showing a suitable form of apparatus adapted to apply a strip of fabric, such as shown in Fig. 5, to the tire being built, at the desired degree of angularity; Fig. 9 is a front elevation, and Fig. 10 a side view, of a detail of such apparatus showing a modification in construction of same; Fig. 11 is a side elevation illustrating a modification of my method for securing the same result; Figs. 12 and 13 are plan views corresponding with Fig. 11, showing how two different degrees of angularity in the application of a strip or ply may be secured; and Figs. 14 and 15 respectively show, in side and front elevation, a device employed in connection with the operation illustrated in the three preceding figures.

In the illustrative construction of tire shown in Fig. 1, an eight-ply tire, or rather tire shoe, is shown, the plies or layers of fabric being arranged in three sets, each made up of a plurality of contiguous layers or plies of thread fabric. The innermost of these sets, as shown at the upper end of the figure in question, is really a double set, being composed of four layers or plies 1, 2, 3, 4, the strands in such first layer or ply lying at an angle of forty-five degrees to a median line at or parallel to the periphery of the tire; the strands of the second layer or ply lying at an angle of thirty degrees to such line; the strands of the third layer or ply lying at an angle of forty-five degrees to such line; and the strands of the fourth layer or ply lying at an angle of thirty degrees to such line. It will be observed that in the case of the first two layers, in which the strands respectively lie at angles of forty-five and thirty degrees to a median line at or parallel to the periphery of the tire, any two such strands run in the same direction, i. e. both lie in the quadrant formed by such line and a transverse line at right angles thereto and passing through the point of intersection of such strands (see Fig. 2); and that similarly in the case of the third and fourth layers, in which the strands respectively lie at forty-five and thirty degrees to a median line at or parallel to the periphery of the tire, any two such strands run in the same direction, i. e. both lie in the quadrant formed by such line and a transverse line at right angles thereto and passing through the point of intersection of such strands (see Fig. 3). However, as clearly shown in the two figures last referred to, the quadrants in which any two such intersecting strands in the pairs of contiguous layers in question thus lie, are located on opposite sides of the median line, the one pair lying on the left and the other on the right thereof.

The second set of contiguous layers of fabric, as shown in Fig. 1, comprises two such layers 5 and 6, in the first of which the strands lie at an angle of forty-five degrees to the aforesaid median line, and in the second of which the strands lie at an angle of thirty degrees to such line, the strands in the two layers or plies running in the same direction so as to have the relationship shown in Fig. 2. The third set of contiguous layers of fabric also comprises but two such layers 7 and 8, the relative disposition of the strands in these layers being the same as that of the strands in layers 3 and 4, and so corresponding with the showing in Fig. 3.

In between each successive set of such layers or plies of fabric there are preferably interposed layers 9 and 10 of rubber, respectively, which function in an insulating and cushioning capacity, but these layers are not essential. The outermost or last mentioned set of layers of fabric is then covered by the usual breaker strip 11 which is composed of a heavy gum cushion of suitably prepared rubber calendered upon an open-weave fabric, and finally the whole is covered with an outer layer 12 of rubber which constitutes the tread of the tire.

The several strips of fabric which are required in constructing a tire of the description just set forth, according to the present invention, are all cut at the same angle from the original sheet, as shown in Fig. 4, so that wastage will be reduced to a minimum. Assuming the angle chosen to be forty-five degrees, the typical strip $c$ will then present the appearance illustrated in Fig. 5, which strip will obviously serve without change for such of the layers or plies required in the construction of the tire as just described, in which the angularity of the strands to the median line is desired to be forty-five degrees, inasmuch as by simply reversing the strip the strands $d$ may be caused to run either to the right or left of the median line as desired.

In order to secure a different degree of angularity for the threads in the strip as applied to the tire, from that to which the strip is thus initially cut, I now proceed as follows, it being understood that the present improved method is primarily adapted to tires built upon a core or mandrel held in position and rotated by a power-driven chuck, although it may be equally well applied to tires built by hand. Thus in the apparatus shown in Figs. 7 and 8 the core 15, upon which the tire is formed, is designed to be rotated in the direction indicated by the arrow, as the strip $d$ is applied thereto, or to previously applied strips forming the partially completed carcass of a tire. The stock strip $d$, which is cut at the desired degree of angularity or bias from the original sheet, is spliced together so as to form a length sufficient for the construction of one or more tires. This is then rolled on a shell or roller 16 with the usual material placed between the layers of rubber coated fabric, in order that such layers will not stick together. The roll of fabric thus prepared is then placed in a suitable rack (Fig. 7) and partially unrolled, the liner $e$ or other material which has been placed between the layers of rubber coated fabric, being rolled up on another roller 17 as strip $d$ is unrolled from roller 16. The strip of fabric itself is drawn over a truncated roller 18 and applied to the core 15 where it is caused to adhere at a given point at the periphery of the tire, either by the use of a rubber cement or through the adhesion of its own surface to the core or form, which is then revolved for one complete revolution. Such revolution of the core unrolls the fabric strip from the shell 16, the passage of the strip over the various rollers placing it under tension and causing it to be stretched tightly onto the core or form. At the end of one revolution of the core the strip or ply of the fabric is cut or torn apart, the ends of such strip butted together, and the ply rolled down and conformed to the core in the usual manner so as to properly shape it.

The loose end of the strip wound on the shell or roller 16, which has been torn free from the portion of the strip applied to the core or form, is then drawn over a second truncated roller similar to the first, but of different relative end diameters, and again brought to the tire form or core and applied as in the previous instance, after which the form is again rotated through one revolution. The second strip or ply of fabric thus applied, having been drawn across a truncated roller of different angular slope or bevel from that first used, the angularity of the threads of such second strip will differ from that of the first by an amount dependent upon the relative pitch of the two rollers thus used; or instead of two different truncated cones or rollers, the desired effect may be secured by employing one roller of a given angularity for the application of the first ply, and changing it end for end before the second ply is applied.

The application of two or more plies in the manner just described, by the use of two or more rollers, constitutes one set of fabric plies in a tire of the construction heretofore described. A second set of fabric plies or layers may then be added by drawing over the same rollers two more strips which have been rolled up with the warp threads cut at the same angle as those previously employed, but at right angles to them. As already indicated, such strip is obtained by simply rolling up a strip as cut from the original sheet on shell or roller 16 in a direction opposite to that in which the first strip was rolled up.

The placing of the beads, the application of the tread, side wall, and the entire construction of the remainder of the tire, is then carried out by any of the appoved methods employed in current commercial practice.

Where a roller of truncated shape is employed, as hereinbefore described, such roller being of greater diameter at one end than at the other, stretches the strip of fabric unevenly, tending to crowd the strands together on the side of smaller diameter, and to spread them apart on the side of greater diameter. In this way the angularity of the threads in the original sheet from which the strip or ply was cut, may be increased or decreased by distortion, the distortion effected being dependent upon the relative diameters of the respective ends of the truncated roller. It will be apparent that other means than such truncated roller may be utilized to produce the desired distortion in the angularity of the threads or strands in such strip. Thus such distortion will follow the use of any means whereby one side of the strip or ply of fabric is caused to stretch a greater distance than the other side when the force drawing the ply onto the core or form is applied either at a point midway between its edges or across its entire width.

Thus, as shown in Figs. 9 and 10, in an apparatus of the sort illustrated in Figs. 7 and 8, I may substitute for such truncated roller a cylindrical roller divided transversely into two or more sections 20 and 21, which revolve at different speeds as the ply is drawn over them. The relative speeds at which the sections will revolve may be controlled by the use of any suitable tension device, such as brake bands 22, 23, passing over pulleys 24, 25, attached to the ends of the respective sections, weights 26, 27, of different magnitude, being secured to their free or depending ends of said bands, whereby one section or portion of the roller as a whole is caused to revolve at a different rate of speed from that of the portion immediately adjacent to it.

I have also found that the same distortion of the threads or strands in the strip as it is applied to the core may be accomplished by simply revolving the latter at different rates of speed. As illustrated in Figs. 11, 12 and 13, the application of the successive strips or plies, and the forming of them to the core, is accomplished by the use of round metal disks 30 which press the strip to the core and which are mechanically operated to traverse the latter in a radial direction from its periphery to the bead. Such revolving disk, or "stitcher" as it is commonly termed, is shown on somewhat larger scale in Figs. 14 and 15, and is a familiar implement or device at present employed in the tire making art, two such stitchers being ordinarily carried on a common pivotally mounted support 31 having a handle 32, by means of which it may be swung to bring either of said stitchers into contact with the corresponding side of the tire. It is necessary to stitch down one side of a ply at a time, with the core revolving in different directions, since the threads in such ply should run away from the stitcher; otherwise there will be a tendency for crowding or wrinkling.

Thus as shown in Fig. 12, as the ply comes forward in the direction indicated by the arrow, the stitcher handle 32 is moved from its normal inoperative position A to position B, thus bringing the disk 30 to bear against the "trailing" edge of the ply having regard to the angle of the threads to the line in which the ply is moving. When this side of the ply has been forced against the core and completely rolled down, the direction of the core is reversed and the stitcher handle swung into position C, so as to roll the other side of the ply down.

Now at a stated speed of rotation, such as is ordinarily employed, the threads of the ply as thus rolled down will retain practically their original angularity with respect to the median line of the strip of fabric composing the ply; for example, an angularity of 45°, as indicated in said Fig. 12.

However, if the core be revolved at a more rapid rate of speed, for example twice as rapidly as in ordinary practice, and the two sides of the strip or ply be stitched down otherwise in the same fashion as just described, such angularity of the threads will be altered to a considerable extent, and may be changed from the original 45° to approximately 30° as shown in Fig. 13. By using other rates of rotation any desired change in angularity, within reasonable limits, is thus obtainable. In practice, one ply will be rolled down or stitched to retain the normal angularity of the threads, then the next ply will have such angularity altered by this method, just as in the case of the method first described above.

Other modes of applying the principle of my invention may be employed instead of the one explained, change being made as regards the steps herein disclosed, provided those stated by any of the following claims or their equivalents be employed.

I therefore particularly point out and distinctly claim as my invention:—

1. In a method of making tires of the character described, the steps which consist in applying circumferentially to a suitable mandrel a strip of thread fabric, and simultaneously subjecting said strip along one side to treatment adapted to crowd the strands of such fabric together and along the other side to treatment adapted to spread such strands apart, such last-mentioned step preceding any stitching of said strip.

2. In a method of making tires of the character described, the steps which consist in applying circumferentially to a suitable mandrel a strip of thread fabric held in longitudinal tension, and varying such tension between the respective sides of said strip whereby the strands of such fabric are crowded together along one side and spread apart along the other side, such last-mentioned step preceding any stitching of said strip.

3. In a method of making tires of the character described, the steps which consist in applying circumferentially to a suitable mandrel a strip of thread fabric held in longitudinal tension, and passing said strip in advance of its application to said mandrel over means adapted to vary the tension between the two sides of said strip, whereby such strands are crowded together along one side and spread apart along the other.

4. In a method of making tires of the character described, the steps which consist in applying circumferentially to a suitable mandrel a strip of thread fabric, simultaneously subjecting said strip along one side to treatment tending to crowd the strands of such fabric together and along the other side to treatment tending to spread such strands apart, then applying a second strip in the same manner but with the condition as to crowding and spreading of strands reversed, and subsequently stitching said strips together.

5. In a method of making tires of the character described, the steps which consist in applying circumferentially to a suitable mandrel a strip of fabric, passing said strip in advance of its application to said mandrel over means adapted to vary the tension between the two sides of said strip, whereby such strands are crowded together along one side and spread apart along the other, and then applying a second strip in the same manner but with the condition as to tension reversed so as to correspondingly reverse the condition as to crowding and spreading of the strands therein.

Signed by me, this 9th day of August, 1920.

GEORGE D. KRATZ.